(12) United States Patent
Heer et al.

(10) Patent No.: US 7,215,337 B2
(45) Date of Patent: May 8, 2007

(54) SYSTEMS AND METHODS FOR THE ESTIMATION OF USER INTEREST IN GRAPH THEORETIC STRUCTURES

(75) Inventors: Jeffrey M. Heer, Berkeley, CA (US); Stuart K. Card, Los Altos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 102 days.

(21) Appl. No.: 10/737,849

(22) Filed: Dec. 18, 2003

(65) Prior Publication Data

US 2005/0134589 A1 Jun. 23, 2005

(51) Int. Cl.
*G06T 15/00* (2006.01)

(52) U.S. Cl. ................ 345/440; 345/589; 345/619

(58) Field of Classification Search ........ 345/589, 345/593, 600, 156, 619, 440
See application file for complete search history.

(56) References Cited

U.S. PATENT DOCUMENTS

| | | | | |
|---|---|---|---|---|
| 5,786,820 | A * | 7/1998 | Robertson | 715/853 |
| 6,054,843 | A * | 4/2000 | Oglesbee et al. | 320/136 |
| 6,369,819 | B1 * | 4/2002 | Pitkow et al. | 345/440 |
| 6,496,842 | B1 * | 12/2002 | Lyness | 715/514 |
| 6,505,209 | B1 * | 1/2003 | Gould et al. | 707/102 |
| 6,646,652 | B2 * | 11/2003 | Card et al. | 345/645 |
| 6,738,787 | B2 * | 5/2004 | Stead | 707/104.1 |

2002/0118214 A1 8/2002 Card et al.

OTHER PUBLICATIONS

Martin Graham and Jessie Kennedy, Combining linking & focusing techniques for a multiple hierarchy visualization, Mar. 1, 2001, School of Computing Napier University, 219 Colinton Road, Edinburgh, EH14 IDJ, UK.*
Stuart K. Card, David Nation, Degree-Of-Interest Trees: A Component of an Attention-Reactive User Interface, May 22-24, 2002, Palo Alto Reseaerch Center.*
Helmut Doleisch, Martin Gasser, Helwig Hauser, Interactive Feature Specification for Focus+Context Visualization of Complex Simulation Data, 2003, VRVis Research Center, Vienna, Austria*

(Continued)

*Primary Examiner*—Phu K. Nguyen
(74) *Attorney, Agent, or Firm*—Christian Austin-Hollands

(57) ABSTRACT

Techniques for estimating user interest in graph structures are provided. A graph structure containing at least two nodes, a threshold disinterest value and at least one interesting node within the graph structure are determined. Each determined interesting node is added to a set of active nodes. Adjacent nodes connected to the set of active nodes and associated with Degree-Of-Interest values more interesting than the threshold disinterest value are in turn added to the set of active nodes until no additional adjacent connected nodes have a Degree-Of-Interest value more interesting than the threshold value. A new visualization of the graph structure is determined based on the nodes in the set of active nodes. The interesting nodes may be determined based on specific indications of interest in a node, such as a mouse selections, or may be based on the user's focus of attention within the graph based information structure.

25 Claims, 9 Drawing Sheets

OTHER PUBLICATIONS

Ivan Herman, Member, IEEE Computer Society, Guy Melancon, and M. Scott Marshall, Graph Visualization and Navigatio in information Visualization :A Survey, Jan.-Mar. 2000, IEEE Transactions on Visualizatio and Computer Graphics.*

Furnas, G. W., The FISHEYE view: A new look at structured files. Bell Laboratories Technical Memorandum, #82-11221-22, Oct. 18, 1982. (23pps).

Furnas, G. W., Generalized fisheye views. Human Factors in Computing Systems CHI '96 Conference Proceedings, Boston, Apr. 13-17, 1986, 16-23.

Lamping, J. et al. "Laying Out and Visualizing Trees Using A Hyperbolic Space", Proceedings of UIST '94, ACM, 1994.

Johnson, B. et al., "Treemaps: A space-filling approach to the visualization of hierarchical information structures", In Proc. of the 2nd International IEEE Visualization Conference (San Diego, Oct. 1991) 284-291.

G.W. Furnas, "The Fisheye view: a new look at structured files" In Readings in Information Visualization: Using Vision to Think, S.K. Card, J.D. Mackinlay and B. Shelderman (eds.) San Francisco, Morgan Kaufman Publishers Inc. 1981/1999 p.312-330.

S.K. Card et al. "The Psychology of Human-Computer Interaction", Hillsdale, NJ, Lawrence Erlbaum, 1983, pp. 23-97.

* cited by examiner

| identifier | DOI | x | y | size | Color |
|---|---|---|---|---|---|
| 0 | 0 | 175 | 175 | 40 | WHITE |
| 1 | -1 | 200 | 125 | 40 | GRAY |
| 2 | 0 | 250 | 175 | 20 | WHITE |
| 3 | -2 | 250 | 75 | 40 | BLACK |
| 4 | -2 | 275 | 125 | 20 | BLACK |
| 5 | 0 | 200 | 25 | 40 | WHITE |
| 6 | -1 | 175 | 75 | 20 | GRAY |
| 7 | -3 | . | . | . | TAN |
| 8 | -3 | . | . | . | TAN |
| 9 | -3 | . | . | . | TAN |
| 10 | -3 | . | . | . | TAN |
| 11 | 0 | . | . | . | WHITE |
| 12 | -1 | . | . | . | GRAY |
| 13 | -2 | . | . | . | BLACK |
| 14 | -2 | 175 | 75 | 20 | BLACK |

| identifier | DOI | x | y | size | Color |
|---|---|---|---|---|---|
| 0 | 0 | 175 | 175 | 40 | WHITE |
| 1 | -1 | 200 | 125 | 40 | GRAY |
| 2 | 0 | 250 | 175 | 20 | WHITE |
| 3 | -2 | 250 | 75 | 40 | BLACK |
| 4 | -2 | 275 | 125 | 20 | BLACK |
| 5 | 0 | 200 | 25 | 40 | WHITE |
| 6 | -1 | 175 | 75 | 20 | GRAY |
| 7 | -2 | . | . | . | BLACK |
| 8 | -2 | . | . | . | BLACK |
| 9 | -2 | . | . | . | BLACK |
| 10 | -2 | . | . | . | BLACK |
| 11 | 0 | . | . | . | WHITE |
| 12 | -1 | . | . | . | GRAY |
| 13 | -2 | . | . | . | BLACK |
| 14 | -2 | 175 | 75 | 20 | BLACK |

| identifier | dirty | DOI | x | y | size | Color |
|---|---|---|---|---|---|---|
| 0 | 1 | 0 | 175 | 175 | 40 | WHITE |
| 1 | 1 | -1 | 200 | 125 | 40 | WHITE |
| 2 | 1 | 0 | 250 | 175 | 20 | GRAY |
| 5 | 1 | 0 | 250 | 75 | 40 | WHITE |
| 6 | 1 | -1 | 275 | 125 | 20 | GRAY |
| 11 | 1 | 0 | 200 | 25 | 40 | WHITE |
| 12 | 1 | -1 | 175 | 75 | 20 | GRAY |

SYSTEMS AND METHODS FOR THE ESTIMATION OF USER INTEREST IN GRAPH THEORETIC STRUCTURES

This invention was made with Government support under MDA904-03-C-0404 awarded by ARDA. The Government has certain rights in this invention.

BACKGROUND OF THE INVENTION

1. Field of Invention

The adjacent connected nodes determined in step S150 are then added to the set of active nodes in step S160. In various exemplary embodiments according to this invention, less interesting Degree-Of-Interest values may be associated with increasing negative numbers. The focus of attention or most interesting node is typically associated with a most interesting Degree-Of-Interest value of zero. However, it will be apparent that any ordering of Degree-Of-Interest values may be used without departing from the scope of this invention. After the set of active nodes have been determined, control continues to step S170.

2. Description of Related Art

The request from the internet enabled personal computer 300 is received by the input/output circuit or routine 10 of the second user interest estimation manager or system 101. The processor 21 of the user interest estimation manager or system 100 activates the input/output circuit 11 to retrieve the documents 1000–1002 from the information repository 200.

The processor 21 determines the graph structure to be displayed in the visualization. The focus of attention determination circuit or routine 41 is then activated to determine interesting nodes based on the user's focus of the attention. For example, a user selection of a specific node with cursor, eye and/or head tracking, gesture tracking and the like may be used to determine the interesting nodes. However, it should be apparent that any known or later developed method of determining a focus of attention may also be used in the practice of this invention. The processor 21 then adds the determined focus of attention nodes to the set of active nodes as interesting nodes.

For example, determining Degree-Of-Interest values using Furnas' conventional techniques typically results in run times proportional to the size of the graph structure. Thus, since these conventional visualization systems require time proportional to the number of nodes in the graph structure, they do not scale well. As the size of the information structure to be visualized increases, delays in presentation and interaction are introduced.

The delays may also affect the usability of the dynamic interactive visualization systems. For example, Card et al., notes in The Psychology of Human-Computer Interaction", Hillsdale, N.J., Lawrence Erlbaum, 1983, herein incorporated by reference in its entirety, that delays of more than a 100 milliseconds are perceived by the human visual system and tend to interrupt the user. Thus, to avoid perceptible presentation and interaction delays, dynamic interactive visualization systems must render the complete visualization within a smaller 100 millisecond window.

These constraints tend to limit the deployment of visualization systems. Moreover, these constraints also limit the size of the graph structures that can be dynamically visualized. Some researchers have attempted to optimize the Degree-Of-Interest function to address these limitations. For example, in "Generalized fisheye views" in Proceedings of CHI'86, Human Factors in Computer Systems, 1986, herein incorporated by reference in its entirety, G. W. Furnas notes that nodes to be updated lie within a subtree rooted at the nearest common ancestor or the previous and current focus of attention. Certain descendant branches of the subtree may also be pruned. However, the resultant subtree may still be arbitrarily large. Also, these techniques depend on features associated with the specific Degree-Of-Interest function used. Thus, separate optimizations for each Degree-Of-Interest function are typically necessary.

SUMMARY OF THE INVENTION

A reduction in the complexity of the Degree-Of-Interest determination would be useful. The system and methods of this invention provide for determining Degree-Of-Interest values for interesting or visible nodes. Un-interesting nodes are assigned a saturated value, called the threshold disinterest value. One or more interesting nodes are then determined. The interesting nodes may be determined based on user selections, inferred from one or more foci of attention and the like. The determined interesting nodes are added to the set of active nodes to be rendered. Nodes adjacent and connected to the set of active nodes and associated with Degree-Of-Interest values above the threshold disinterest value are in turn added to the set of active nodes. When there are no additional adjacent connected nodes with Degree-Of-Interest values above the threshold disinterest value, the active nodes are processed and/or displayed to the user.

These and other features and advantages of this invention are described in, or are apparent from, the following detailed description of various exemplary embodiments of the systems and methods according to this invention.

DETAILED DESCRIPTION OF EXEMPLARY EMBODIMENTS

Figure 1:
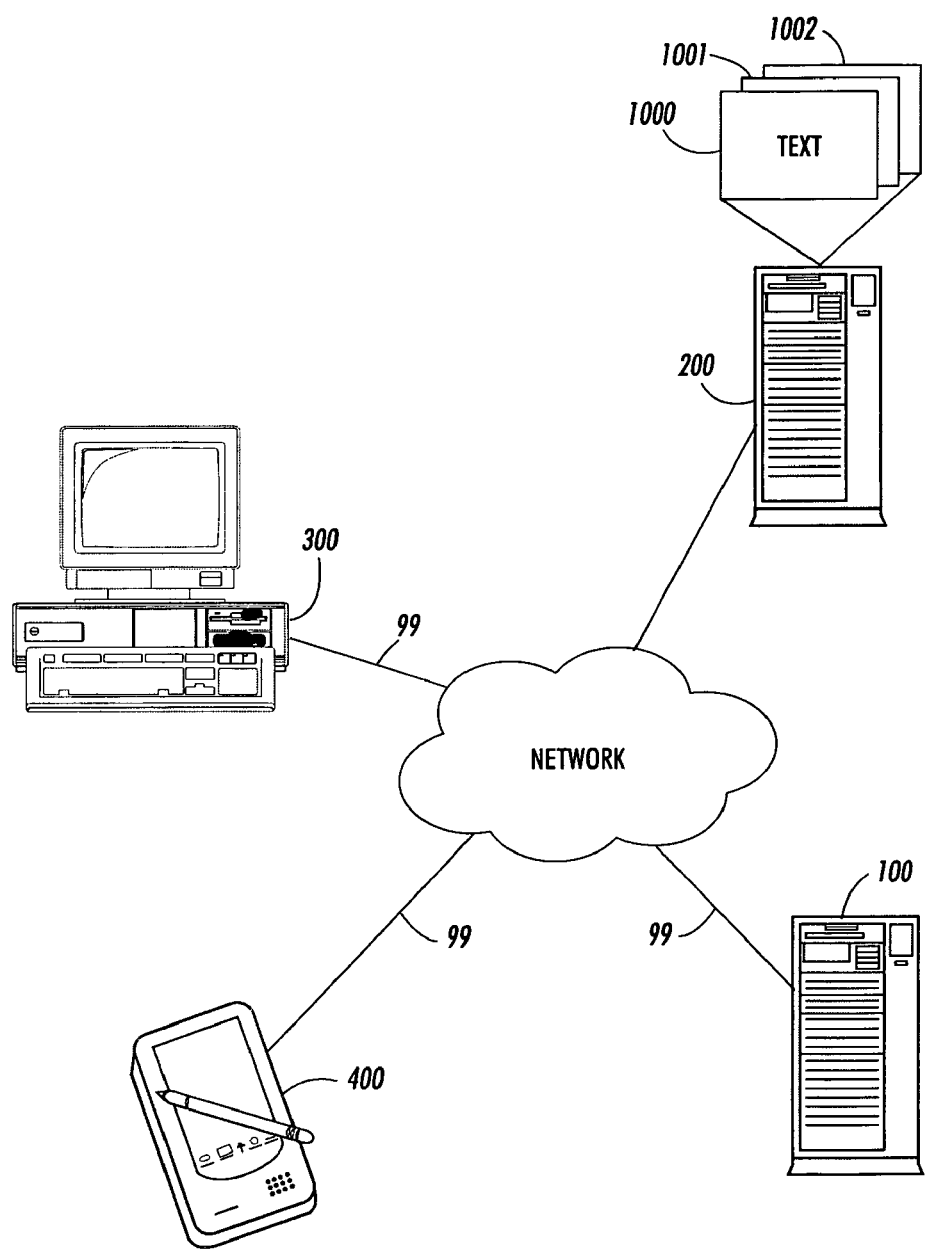
FIG. 1 shows an overview of a user interest estimation manager or system according to one of the various exemplary embodiments of this invention.

FIG. 1 shows an overview of a user interest estimation manager or system according to one of the various exemplary embodiments of this invention. The user interest estimation manager or system 100 is connected via communications links 99 to an information repository 200 and personal computer 300.

In various exemplary embodiments according to this invention, the user of personal computer 300 requests a visualization of the information 1000–1002 contained in the information repository 200. The information 1000–1002 contained in the information repository 200 may contain information encoded in XML, HTML, JPEG, TIFF, PNG, GIF format or any other known or later developed file format or structure. For example, in various exemplary embodiments according to this invention, the information repository 200 may be a catalog of hyperlinked web pages such as Google, Alta Vista, Yahoo, MSN, Overture, DMOZ, and the like. The web pages and hypertext links between the web pages form a graph structure to be visualized.

It will be apparent that these large information repositories can easily exceed millions of nodes. Thus, a visualization system for these large information repositories must be capable of handling large numbers of nodes. As discussed above, Furnas describes a fisheye lens visualization of a graph structure. The fisheye lens visualization provides for the simultaneous display of focus and context information. In Furnas, information outside the focus of attention is compressed while information within the focus of attention is expanded. This focus+ context visualization facilitates the review of detailed information contained in the node while preserving the context of the information within the information space as a whole.

A fisheye visualization is useful in displaying salient information based on a model of the user's Degree-Of-Interest in a given node. A Degree-Of-Interest function distribution for the information structure is determined based on the current focus of attention node or other indication of user interest. For example, for a fisheye view, a fisheye Degree-Of-Interest function distribution across all nodes is determined each time the user changes the focus of attention. As the user focuses attention on a different portion of the information structure, new Degree-Of-Interest values are determined. The Visible nodes in the information structure are then rendered based on the Degree-Of-Interest values derived from the new focus of attention. The overhead of determining Degree-Of-Interest values for millions of nodes in very large data sets can cause delays or even prevent the update of the visualization. In particular, to ensure the perceived responsiveness of the visualization systems, rendering changes based on changes in the focus of attention must complete in less than 100 milliseconds.

In the various exemplary embodiments according to this invention, as new interesting or focal nodes are determined, nodes adjacent and connected to the focal nodes and which are associated with Degree-Of-Interest values above the saturated threshold value are determined. Each adjacent connected node having a Degree-Of-Interest value above the threshold disinterest value is then added to the set of active nodes. In various exemplary embodiments according to this invention, all nodes are assumed to be un-interesting unless connected to an active set node and having a Degree-Of-Interest above the threshold disinterest value.

The active node set reflects the visible nodes to be rendered on the display. As discussed above, the nodes outside the active node set are associated with saturated Degree-Of-Interest values. In various exemplary embodiments according to this invention, the remaining nodes may be replaced with blocks, or other aggregation markers. Thus, as new foci of attention are determined, only more interesting nodes connected to the focus of attention nodes are determined thereby reducing the number of calculations required to render nodes in the visualization.

It will be apparent that in various other exemplary embodiments according to this invention, the user interest estimation manager or system 100 may be incorporated directly into an information repository 200, a portable tablet PC 400 or any other device or system accessible over the communications link 99.

Figure 2:
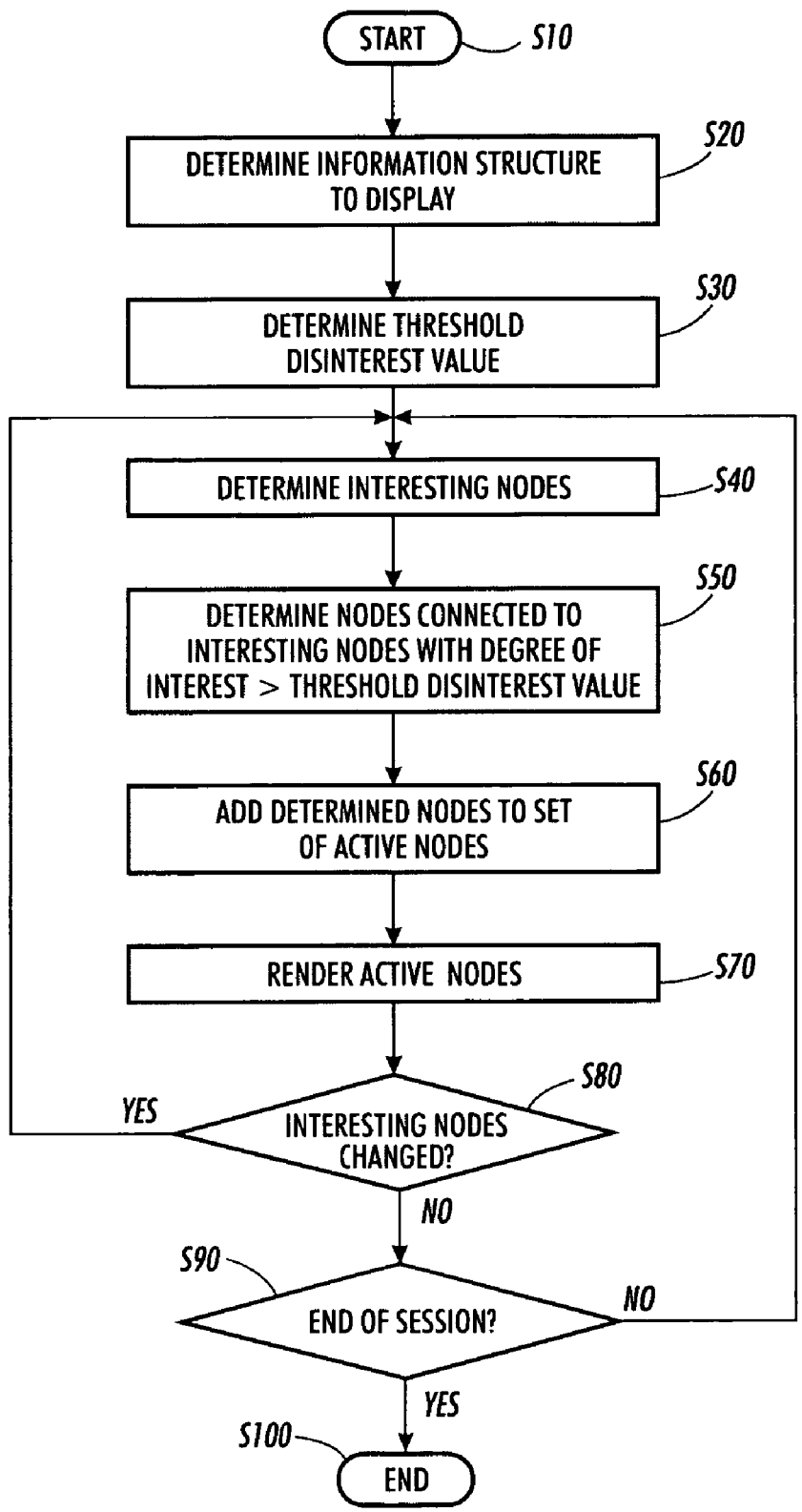
FIG. 2 shows a first method of user interest estimation according to one of the various exemplary embodiments of this invention.

FIG. 2 shows a method of user interest estimation according to one of the various exemplary embodiments of this invention. The process begins at step S1 and immediately continues to step S20.

In step S20, a graph based information structure to be visualized is determined. The graph based information structure may be a tree or any other graph structure. After the graph based information structure has been determined, control continues to step S30.

A threshold disinterest value is determined in step S30. The threshold disinterest value is the saturated Degree-Of-Interest value assigned to the non-visible nodes. The threshold disinterest value may be determined by retrieving the value from a memory, entering the value dynamically during a visualization session or using any other known or later developed technique or method. After the threshold disinterest value has been determined, control continues to step S40.

At least one interesting node is determined in step S40. The interesting node may be determined based on explicit user indications of interest, inferred from a user's focus of attention or using any known or later developed method. For example, a focus of attention node may be determined based on the user's eye or cursor dwell time over a displayed node. The interesting nodes are determined and added to a set of active nodes. In various other exemplary embodiments of this invention, multiple interesting nodes may be determined. For example, a user may select multiple interesting nodes using mouse actions or any other method of selecting a node. Additional interesting nodes are similarly selected and added to the set of active nodes. After the interesting nodes have been selected, control continues to step S50.

In step S50, the adjacent nodes connected to the set of active nodes and associated with Degree-Of-Interest values more interesting than the threshold value are determined. The nodes connected to the set of active nodes are determined based on links between nodes in the graph structure. For example, in one exemplary embodiment according to this invention, an initial focus of attention node is determined. The interesting node is then added to the set of active nodes as the initial active node. Each node in the set of active nodes is selected. If the selected node has child nodes, adjacent child nodes of the selected node that are associated with more interesting Degree-Of-Interest values are also determined. Similarly, if the active node has parent nodes, the adjacent connected parent nodes having more interesting Degree-Of-Interest values are determined. The process of selecting child and parent nodes ends when there are no additional adjacent connected nodes having more interesting Degree-Of-Interest values. It will be apparent that more interesting Degree-Of-Interest values are Degree-Of-Interest values above the saturated threshold disinterest value The adjacent connected nodes determined in step S50 are then added to the set of active nodes in step S60. In various exemplary embodiments according to this invention, less interesting Degree-Of-Interest values may be associated with increasing negative numbers and an interesting node associated with a Degree-Of-Interest value of zero. However, any ordering of Degree-Of-Interest values may be used without departing from the scope of this invention.

In various other exemplary embodiments according to this invention, the Degree-Of-Interest values are progressively smaller values and the threshold disinterest value is the largest valid Degree-Of-Interest value. After the determined nodes have been added to the set of active nodes, control continues to step S70.

The active nodes are rendered on the display in step S70. The rendering of the active nodes may optionally use clipping or any known or later developed method useful in reducing the graphic transformations necessary to render the display. Control then continues to step S80.

In step S80, a determination is made whether the selection of interesting nodes has changed. The selection of interesting nodes may be changed by de-selecting an interesting node with a mouse selection or the like. However, any known or later developed method of changing the selection of interesting nodes may be used without departing from the scope of this invention.

If a determination is made that the selection of interesting nodes has changed, control immediately jumps to step S40. Steps S40–S80 are then repeated until changes in the selection of interesting nodes are no longer detected. Control then continues to step S90.

In step S90, a determination is made whether the user has requested an end-of-session. The user may request an end of session by entering a keyboard sequence, using a dialog box, a voice command or any other known or later developed end-of-session indicator. If it is determined that an end-of-session has not been requested, control continues to step S40. Steps S40–S90 are repeated until a determination is made in step S90 that an end-of-session has been requested. Control then continues to step S100 and the process ends.

Figure 3:
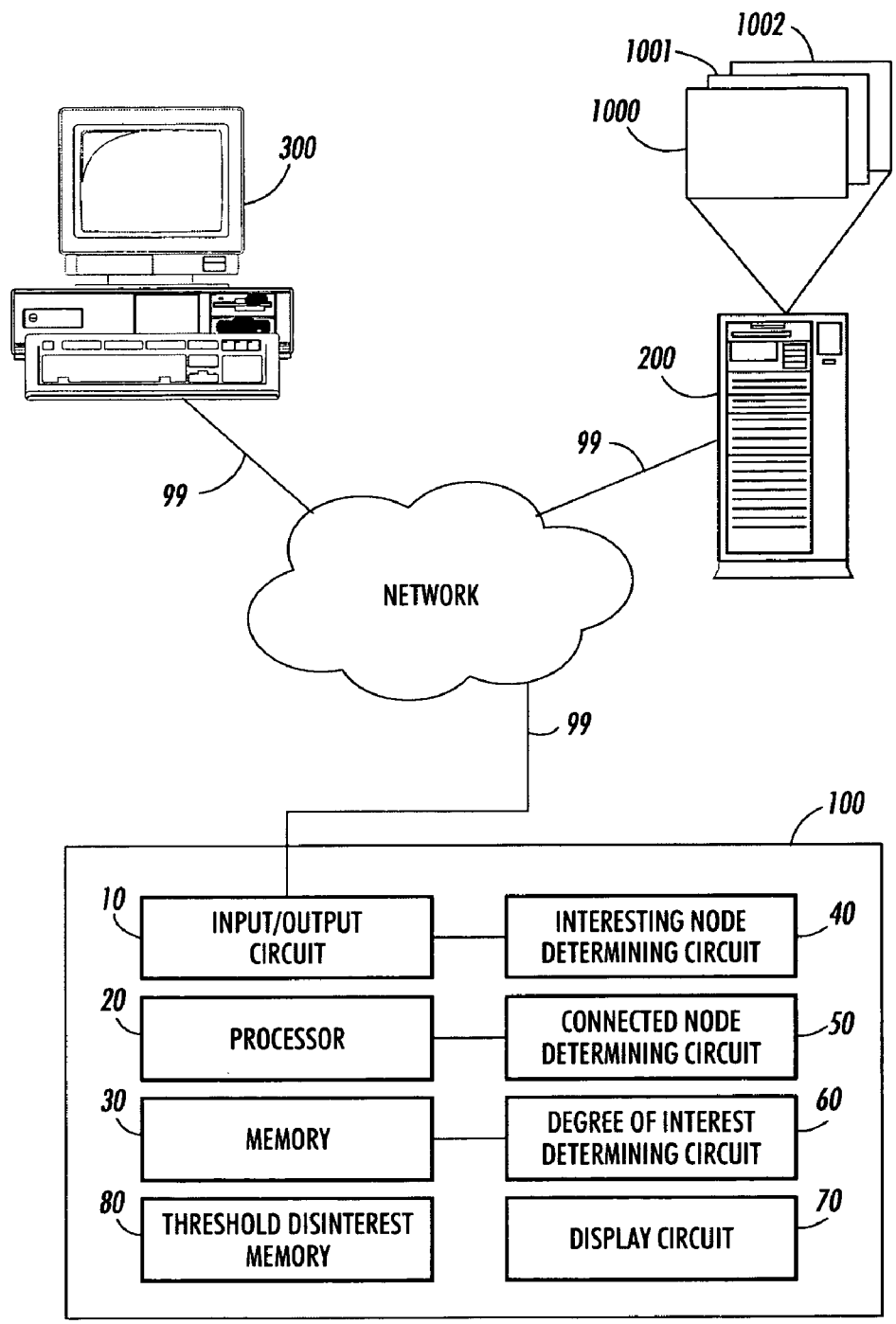
FIG. 3 shows a first user interest estimation manager or system according to one of the various exemplary embodiments of this invention.

FIG. 3 shows a first exemplary user interest estimation manager or system 100 according to one of the various exemplary embodiments of this invention. The user of internet enabled personal computer 300 forwards a request for a visualization of the inter-relationship between documents in the information repository 200. The request is forwarded over communications link 99 and mediated by the first exemplary user interest estimation manager or system 100. The first exemplary user interest manager or system 100 is comprised of: a processor 20; a memory 30; an interest determination circuit 40; a connected node determination circuit 50; a degree of interest determination circuit 60; a display circuit; a threshold disinterest value memory 80 each connected via input/output circuit 10 to communications link 99.

The request from the internet enabled personal computer 300 is received by the input/output circuit or routine 10 of the user interest estimation manager or system 100. The processor 20 of the user interest estimation manager or system 100 retrieves the documents 1000–1002 from the information repository 200. The processor 20 determines the graph based information structure to be displayed in the visualization. The interesting node determination circuit or routine 40 is then activated to determine interesting nodes. In various exemplary embodiments according to this invention, interesting nodes are determined based on a user selection of an interesting node, determining an interesting node based on the user's focus of attention or any known or later developed method of determining interesting nodes. For example, a user selection of a specific node with cursor, eye and/or head tracking, gesture tracking and the like may be used to determine the interesting nodes. The processor 20 then adds the interesting nodes to the set of active nodes.

The processor 20 activates the connected node determination circuit or routine 50. The connected node determination circuit 50 determines adjacent connected nodes connected to the set of active nodes. The degree of interest circuit or routine 60 is activated for each of the determined adjacent connected nodes to determine the associated Degree-Of-Interest value. If the associated Degree-Of-Interest value for the selected adjacent connected node exceeds the threshold disinterest value stored in the threshold disinterest value storage 80, the determined adjacent connected node is added to the set of active nodes. Otherwise, the Degree-Of-Interest value for the selected adjacent connected node and all nodes connected to the set of active nodes solely through the selected adjacent connected node, and not already in the set of active nodes, are assigned a Degree-Of-Interest value equal to the disinterest threshold value.

The connected node determination circuit and/or routine 50 and the degree of interest determination circuit or routine 60 are then activated for each of the nodes in the set of active nodes. Determined adjacent nodes exceeding the threshold are in turn added to the set of active nodes until no further nodes remain to be added. For example, if the set of active nodes remains the same between two iterations, additional nodes have not been added to the set of active nodes. Thus, each of the nodes at the periphery of the set of active nodes is un-interesting as indicated by a Degree-Of-Interest value equal to the threshold disinterest value. Nodes in the graph based information structure that are not in the set of active nodes are each assigned a saturated Degree-Of-Interest value equal to the threshold disinterest value. In various exemplary embodiments according to this invention, the Degree-Of-Interest value for each node in the graph based information structure is set or saturated to the threshold disinterest value by default. The selection of interesting nodes based on a focus of attention, user selection and the like sets the Degree-Of-Interest value for the selected node to a most interesting Degree-Of-Interest value.

The processor 20 then activates the display circuit 70 to display the nodes from the set of active nodes. Thus, the spreading determination of Degree-Of-Interest values from the set of active nodes determines the nodes which are to be rendered and/or displayed. Since the number of active nodes is typically less than or equal to the number of nodes resolvable by the user's visual system, the maximum number of active nodes will be fairly small. New visualizations are completed based on a rendering of this smaller number of active nodes.

Figure 4:
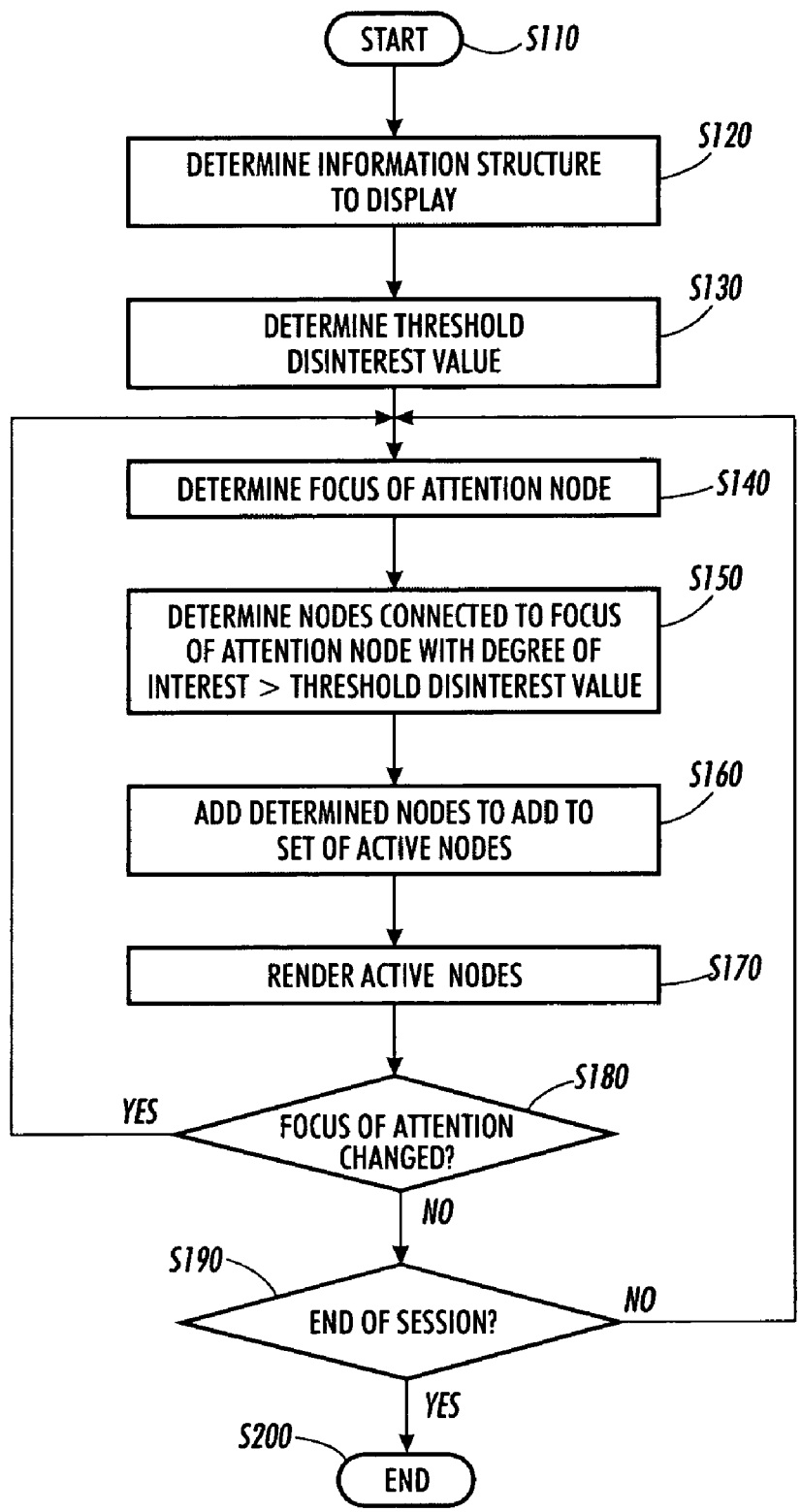
FIG. 4 shows a second method of user interest estimation according to one of the various exemplary embodiments of this invention.

FIG. 4 shows a method of user interest estimation according to one of the various exemplary embodiments of this invention. The process begins at step S110 and immediately continues to step S120.

In step S120, a graph based information structure to be visualized is determined. The graph based information structure may be a tree or any other graph structure. After the graph based information structure has been determined, control continues to step S130.

A threshold disinterest value is determined in step S130. The threshold disinterest value is the saturated Degree-Of-Interest value assigned to the non-visible nodes. The threshold disinterest value may be determined by retrieving the value from a memory, entering the value dynamically during a visualization session or using any other known or later developed technique or method. After the threshold disinterest value has been determined, control continues to step S140.

At least one focus of attention nodes is determined in step S140. The focus of attention may be determined based on head and/or eye-tracking, mouse selections, or any known or later developed method. For example, a single focus of attention node may be determined based on the user's eye or cursor dwell time over a displayed node. However, it will be apparent that in various other exemplary embodiments according to this invention, any known or later method of inferring the focus of attention may be used without departing from the scope of this invention. The focus of attention nodes are determined and added to a set of active nodes. In various other exemplary embodiments of this invention, multiple foci of attention may be determined. For example, foci of attention may be based on eye tracking, head tracking, cursor tracking, a voice command or any other explicit or inferred method of selecting a node. Additional focus of attention nodes are similarly selected and added to the set of active nodes. After the focus of attention nodes have been selected, control continues to step S150.

In step S150, the adjacent nodes connected to the set of active nodes and associated with Degree-Of-Interest values more interesting than the threshold value are determined. The nodes connected to the set of active nodes are determined based on links between nodes in the graph based information structure. For example, in one exemplary embodiment according to this invention, an initial focus of attention node is determined. The focus of attention node is then added to the set of active nodes as the initial active node. Each node in the set of active nodes is selected. If the selected node has child nodes, adjacent child nodes of the selected node that are associated with more interesting Degree-Of-Interest values are also determined. Similarly, if the active node has parent nodes, the adjacent connected parent nodes having more interesting Degree-Of-Interest values are determined. The process of selecting child and parent nodes ends when there are no additional adjacent connected nodes having more interesting Degree-Of-Interest values.

The adjacent connected nodes determined in step S150 are then added to the set of active nodes in step S170. In various exemplary embodiments according to this invention, less interesting Degree-Of-Interest values may be associated with increasing negative numbers. The focus of attention or most interesting node is typically associated with a most interesting Degree-Of-Interest value of zero. However, it will be apparent that any ordering of Degree-Of-Interest values may be used without departing from the scope of this invention. After the set of active nodes have been determined, control continues to step S170.

The active nodes are rendered on the display in step S170. The rendering of the active nodes may optionally use clipping or any known or later developed method useful in reducing the graphic transformations necessary to render the display. Control then continues to step S180.

In step S180, a determination is made whether the focus of attention has changed. The focus of attention may be changed by de-selecting a focus of attention node using a mouse selection and the like. However, any known or later developed method of determining changes in the focus of attention may also be used.

If a determination is made that the focus of attention has changed, control immediately jumps to step S140. Steps S140–S180 are then repeated until changes in the focus of attention are no longer detected. Control then continues to step S190.

In step S190, a determination is made whether the user has requested an end-of-session. The user may request an end of session by entering a keyboard sequence, using a dialog box, a voice command or any other known or later developed end-of-session indicator. If it is determined that an end-of-session has not been requested, control continues to step S140. Steps S140–S190 are repeated until a determination is made in step S190 that an end-of-session has been requested. Control then continues to step S200 where the process ends.

Figure 5:
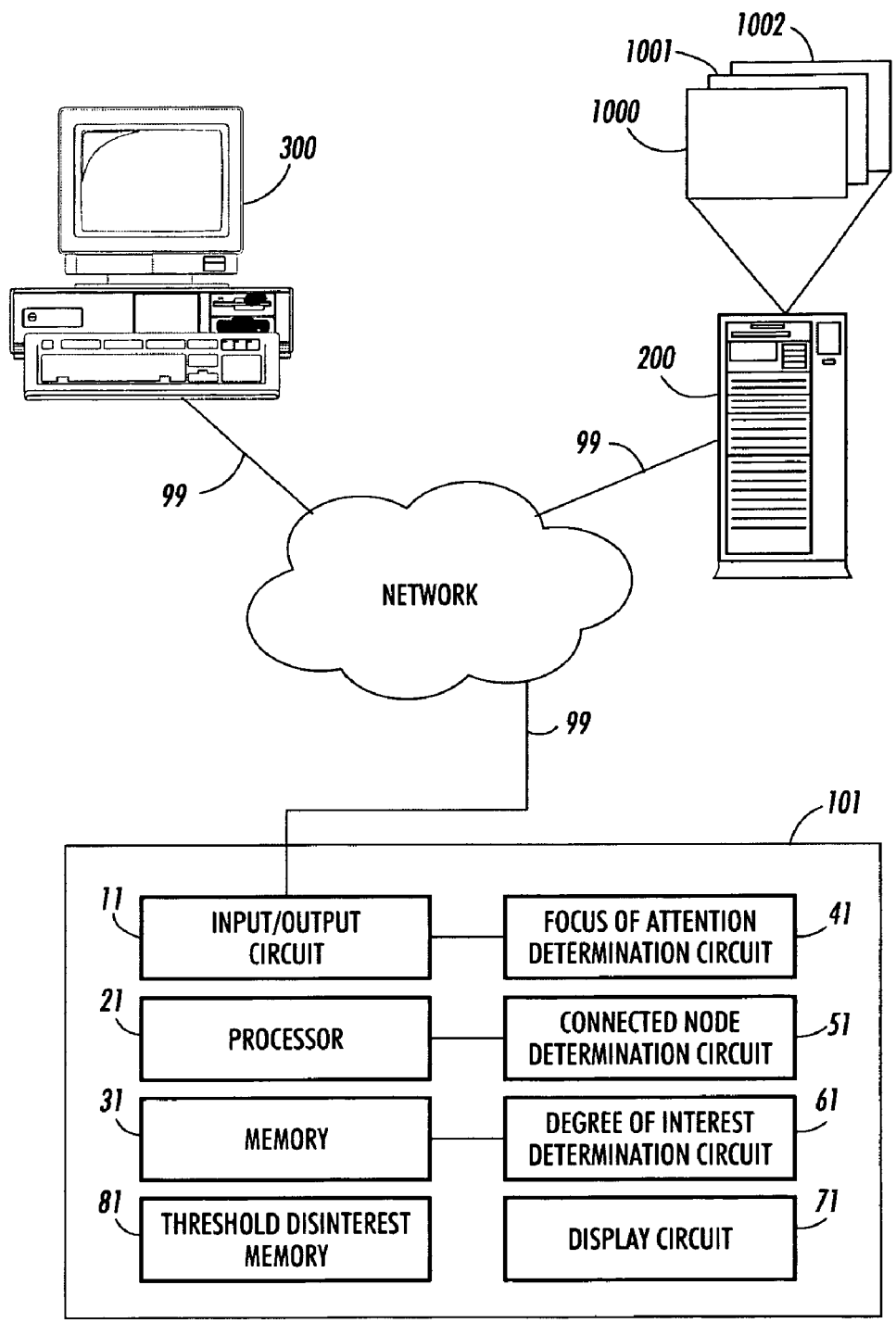
FIG. 5 shows a second user interest estimation manager or system according to one of the various exemplary embodiments of this invention.

FIG. 5 shows a second user interest estimation manager or system 11 according to one of the various exemplary embodiments of this invention. The user of internet enabled personal computer 300 forwards a request for a visualization of the inter-relationship between documents in the information repository 200. The request is forwarded over communications link 99 and mediated by the second exemplary user interest estimation manager or system 101.

The first exemplary user interest manager or system 101 is comprised of: a processor 21; a memory 31; a focus of attention determination circuit 41; a connected node determination circuit 51; a degree of interest determination circuit 61; a display circuit; a threshold disinterest value memory 81 each connected via input/output circuit 11 to communications link 99.

The request from the internet enabled personal computer 300 is received by the input/output circuit or routine 10 of the second user interest estimation manager or system 101. The processor 21 of the user interest estimation manager or system 100 activates the input/output circuit 11 to retrieve the documents 1000–1002 from the information repository 200.

The processor 21 determines the graph structure to be displayed in the visualization. The focus of attention determination circuit or routine 41 is then activated to determine interesting nodes based on the user's focus of the attention. For example, a user selection of a specific node with cursor, eye and/or head tracking, gesture tracking and the like may be used to determine the interesting nodes. However, it should be apparent that any known or later developed method of determining a focus of attention may also be used in the practice of this invention. The processor 21 then adds the determined focus of attention nodes to the set of active nodes as interesting nodes.

The processor 21 activates the connected node determination circuit or routine 51. The connected node determination circuit 51 determines adjacent connected nodes connected to the set of active nodes. The degree of interest circuit or routine 61 is activated for each of the determined adjacent connected nodes to determine the associated Degree-Of-Interest value. If the associated Degree-Of-Interest value for the selected adjacent connected node exceeds the threshold disinterest value stored in the threshold disinterest value storage 81, the determined adjacent connected node is added to the set of active nodes. Otherwise, the Degree-Of-Interest value for the selected adjacent connected node and all nodes connected to the set of active nodes solely through the selected adjacent connected node, and not already in the set of active nodes are assigned a Degree-Of-Interest value equal to the disinterest threshold value.

The connected node determination circuit and/or routine 51 and the degree of interest determination circuit or routine 61 are then activated for each of the nodes in the set of active nodes. Determined adjacent nodes exceeding the threshold are in turn added to the set of active nodes until no further nodes remain to be added. For example, if the set of active nodes remains the same between two iterations, additional nodes have not been added to the set of active nodes. Thus, each of the nodes at the periphery of the set of active nodes is un-interesting as indicated by a Degree-Of-Interest value equal to the threshold disinterest value. Nodes in the graph based information structure that are not in the set of active nodes are each assigned a saturated Degree-Of-Interest value equal to the threshold disinterest value. In various exemplary embodiments according to this invention, the Degree-Of-Interest value for each node in the graph based information structure is set or saturated to the threshold disinterest value by default. The selection of interesting nodes based on a focus of attention, user selection and the like sets the Degree-Of-Interest value for the selected node to a more interesting Degree-Of-Interest value.

The processor 21 then activates the display circuit 71 to display the nodes from the set of active nodes. Thus, the spreading determination of Degree-Of-Interest values from the set of active nodes determines the nodes which are to be rendered and/or displayed. Since the number of active nodes is less than or equal to the number of nodes resolvable by the user's visual system, the maximum number of active nodes will be fairly small. New visualizations are completed based on a rendering of this smaller number of active nodes.

Figures 6, 7:
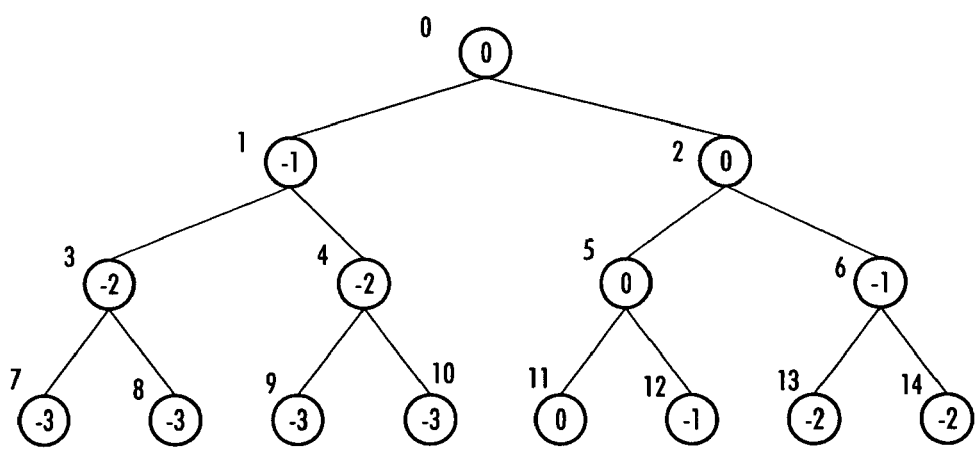
FIG. 6 shows a conventional information storage structure.
FIG. 7 shows a conventional visualization of the information storage structure of FIG. 6.

FIG. 6 shows a conventional information storage structure 500. The conventional information storage structure is comprised of an index portion 510, a degree of interest portion 520, an x-coordinate portion 530, a y-coordinate portion 540, a size portion 550, and a color portion 560.

The index portion 510 of the first row of the conventional information structure storage 500 contains a "0" value associated with the identifier of the node. The degree of interest portion 520 contains the value "0" indicating the node is associated with the highest degree of interest. It will be apparent however that although a "0" Degree-Of-Interest value indicates the highest or most interesting value in one of the various exemplary embodiments according to this invention, any known or later developed ordering of the Degree-Of-Interest information may be used in the practice of this invention.

The x-coordinate portion 530 and y-coordinate portions 540 contain the values "175" and "75" respectively. The x-coordinate portion 530 and y-coordinate portions 540 reflect a position of the node within the display space.

The size portion 550 contains the value "40" which indicates the size of the displayed node. In various exemplary embodiments according to this invention, the size of the node may be adjusted to indicate additional information about the nodes.

The color portion 560 of the conventional information structure storage 500 contains the value "WHITE". In various exemplary embodiments according to this invention, the color portion 560 may be used to encode additional information about the nodes. It will be apparent that although size and color are described in terms of one of the exemplary embodiments, any human perceptible display characteristic useful in conveying information about the nodes may be used in the practice of this invention.

The second row of the conventional information structure storage 500 contains the values "1", "−1", "200", "125", "40", "GRAY". These values indicate node "1" has a "−1" Degree-Of-Interest positioned at x-coordinate 200 and a y-coordinate 125. Thus, the node is associated with a size of 40 and the color "GRAY".

The sixth row of the conventional information structure storage 500 contains values "0", "200", "25", "40", "WHITE". These values indicate node "5 is associated with a Degree-Of-Interest value of "0" positioned at x-coordinate 200, y-coordinate 25, and which has a size of 40 and a "WHITE" color.

The tenth row of the conventional information structure contains the values "9", "−3", "175", "30", "20", "TAN". These values indicate that the node "9" is associated with a "−3" Degree-Of-Interest value and is positioned at x-coordinate 175 and y-coordinate 30. The node has size 20 and is of a "TAN" color.

FIG. 7 shows a conventional visualization of the information storage structure of FIG. 6. Node "0" forms the root of the tree. The root node is associated with an exemplary highest Degree-Of-Interest value of "0". In various exemplary embodiments according to this invention, the high Degree-Of-Interest values may be associated with user selected foci of attention. The second node is labeled "−1" indicating a Degree-Of-Interest value of "−1". The third node is labeled "0" indicating the highest Degree-Of-Interest.

Figures 8, 9:
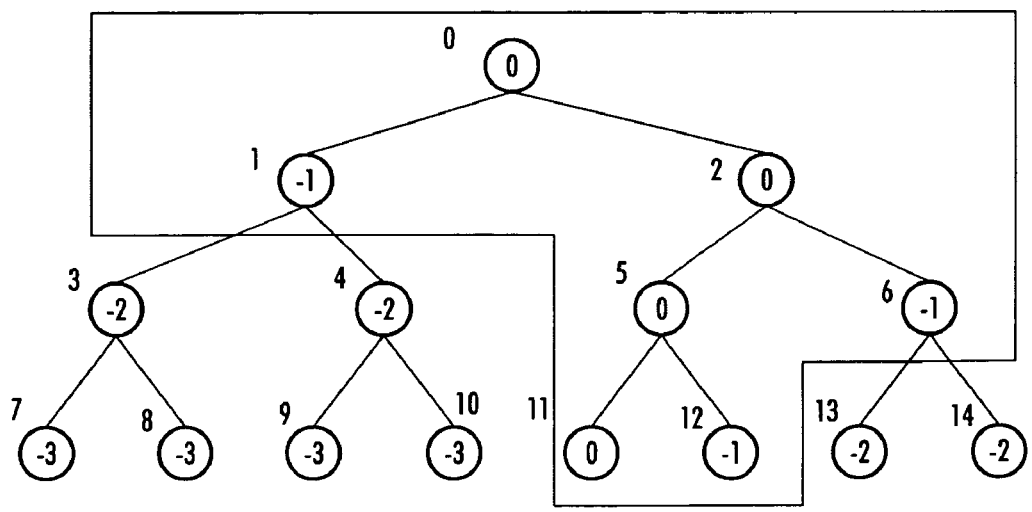
FIG. 8 shows an exemplary information storage structure according to one of the exemplary embodiments of this invention.
FIG. 9 shows a visualization of the information storage structure of FIG. 8 according to one of the exemplary embodiments of this invention.

FIG. 8 shows an exemplary information storage structure according to one of the exemplary embodiments of this invention. The information structure storage 600 is comprised of a node identifier 610, a degree of interest portion 620, an x-coordinate portion 630, a y-coordinate portion 640, a size portion 650, and a color portion 660.

The first row of the exemplary information structure storage 600 contains the values "0", "0", "175", "175", "40", "WHITE". These values indicate that node "0" is associated with a Degree-Of-Interest value of "0", an x-coordinate value of "175" and y-coordinate value of "175", a size of "40" and the color "WHITE".

The second row of the exemplary information structure storage 600 contains the values "1", "−1", "200", "125", "40", "GRAY". This indicates that node "1" is associated with a Degree-Of-Interest value of "−1", an x coordinate of "200", a y coordinate of "125", a size of "40" and the color "Gray".

The Degree-Of-Interest values for rows 7–9 of the exemplary information structure storage 600 have each been assigned the saturated threshold disinterest value of "−2". In contrast, rows 7–9 of the conventional information storage structure 500 each show the determination of specific Degree-Of-Interest values of "−3". In the interests of clarity of discussion, only three nodes in the graph based information structure are indicated as not present in the set of active nodes. However, it will be apparent that for large graph based information structures, most nodes will fall outside of the set of active nodes. Thus, the complexity of determining Degree-Of-Interest for nodes is reduced by the systems and methods of this invention.

FIG. 9 shows a visualization of the information storage structure of FIG. 6 according to one of the exemplary embodiments of this invention. A previously selected threshold disinterest value of "−2" was selected. The focus of attention root node is associated with a Degree-Of-Interest value of "0". Nodes to be rendered as visible nodes by the display system are associated with interesting Degree-Of-Interest values that exceed the threshold disinterest value.

The first node is then selected as an adjacent connected node. The first node is added to the active node list since the node is associated with a Degree-Of-Interest value of "−1". The second node is a second focus of attention node and is associated with a Degree-Of-Interest value of "0".

In successive iterations, the Degree-Of-Interest values for the fifth, sixth, eleventh and twelfth nodes are each associated with Degree-Of-Interest values that exceed the threshold disinterest values. Thus, the fifth, sixth, eleventh and twelfth nodes are also added to the set of active nodes that will be rendered by the display system.

Figures 10, 11:
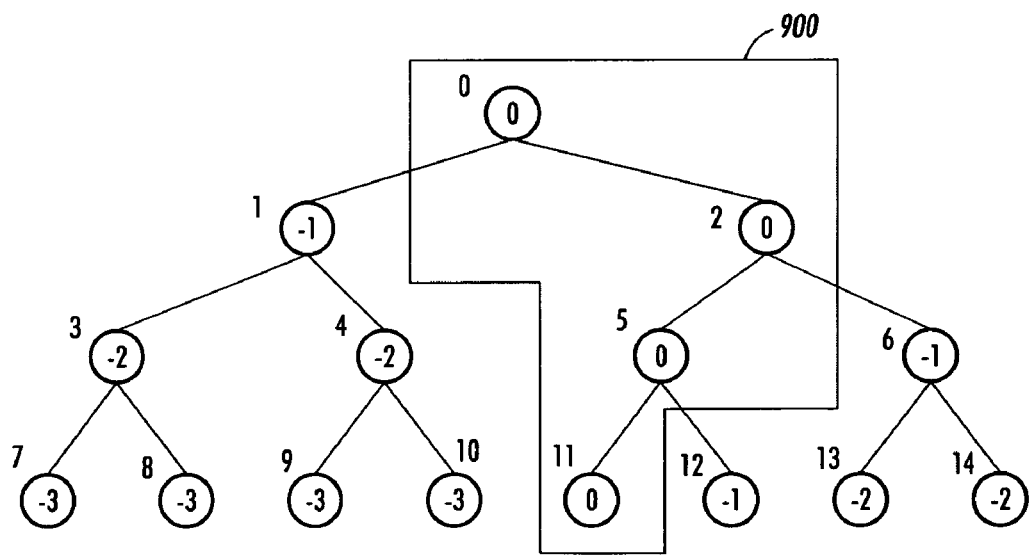
FIG. 10 shows a backing data structure for storing estimated user interest information according to one of the exemplary embodiments of this invention.
FIG. 11 shows a first set of active nodes according to an exemplary embodiment of this invention.

FIG. 10 shows a backing data storage structure for storing estimated user interest information according to one of the exemplary embodiments of this invention. The backing data storage structure for storing user interest estimation information is comprised of an identifier portion 710, a dirty bit portion 720, a degree of interest portion 730, an x-coordinate portion 740, a y-coordinate portion 750, a size portion 760 and a color portion 770.

The first row of the exemplary data structure 700 contains the values "0", "1", "0", "175", "175", "40", "WHITE". The value "0" in the identifier portion 710, the value "1" in the optional dirty bit portion 720 and "0" value in the Degree-Of-Interest portion 730. These values indicate that node "0" is to be displayed at an x-coordinate of "175" a y-coordinate of "175" at a size of "40" in the color "WHITE".

The backing data storage structure contains non-structural attributes necessary for the display of visible nodes. When an attribute is needed, the backing data storage structure is consulted. If the node is not in the backing data storage structure, a suitable default is supplied. In such cases, the Degree-Of-Interest value returned is the saturated threshold disinterest value. The position returned is the position of the nodes first visible ancestor. This allows newly visible nodes to flow out from their parents. Nodes are transparently added to the backing data storage structure, if not already present when the nodes Degree-Of-Interest value is set. Also anytime a nodes' Degree-Of-Interest value is assigned, a dirty bit is set for the corresponding row in the backing data storage structure.

Upon completion of the Degree-Of-Interest computation for a graph based information structure, all non-dirty backing data storage structure entries become invalid and all dirty entries have their dirty bit cleared. This allows the data structure to maintain the state of nodes that remain visible across transitions while freeing up space as nodes are elided.

In various exemplary embodiments according to this invention, table operations such as row deleting are reduced by clearing the non-valid entries and resetting dirty bits for changed entries. These operations facilitate tracking of visible nodes across transitions while freeing up space in the backing data structure for storing user interest estimation information. It will be apparent however that any known or later developed method of storing information may be used in the practice of this invention.

It will also be apparent that any Degree-Of-Interest function may be used to determine the values stored in the degree of interest portion 730. For example, a fisheye Degree-Of-Interest function distribution, a parabolic Degree-Of-Interest function distribution or any other Degree-Of-Interest function useful in identifying salient information for visualizations.

The x-coordinate portion 740 contains the value "175" indicating that the node is located at the "175" position in the coordinate system. The y-coordinate portion 750 contains the value "175" indicating the node is to be displayed at y location "175".

The size portion 760 contains the value "40" indicating that the node is to be displayed with a size of 40. It will be apparent that in various other exemplary embodiments, the size attribute of the node may be used to indicate other features or attributes associated with the node. For example, the size may be expanded to indicate the node is one of the foci of attention selected by the user.

In various other exemplary embodiments, the size of the nodes may be dynamically adjusted to show relationships between nodes. Thus, the nodes representing all the documents associated with a specific keyword may be displayed at an increased size.

The color portion 770 of the exemplary backing data structure contains the value "WHITE". In various exemplary embodiments, the nodes associated with most interesting Degree-Of-Interest values are displayed in white. Thus, the color portion 770, alone or in combination with the optimal size portion 760, may be used to indicate other features in the visualized graph based information structure.

FIG. 11 shows a first set of active nodes according to an exemplary embodiment of this invention. The set of active nodes 900 is comprised of nodes 0, 2, 5 and 11. Each of the selected active nodes is associated with Degree-Of-Interest values of "0". The high Degree-Of-Interest value indicates that the nodes are foci of attention selectable based on eye tracking, head tracking, cursor tracking or any other known or later developed method of determining foci of attention. The determined focus of attention nodes are added to the set of active nodes 900. Connected nodes adjacent to the set of active nodes 900 are then determined. Adjacent connected nodes having Degree-Of-Interest values above the threshold disinterest value are determined and added to the set of active nodes 900.

In various exemplary embodiments according to this invention, nodes in the graph structure that are not in the set of active nodes are associated with a saturated Degree-Of-Interest value called the threshold disinterest value. In various exemplary embodiments according to this invention, each node that is not in the set of active nodes is assigned the saturated threshold disinterest value. Most Degree-Of-Interest functions define a convex surface locally about the focus of attention nodes. In these cases where the Degree-Of-Interest function is convex, only nodes having a Degree-Of-Interest value above the threshold value are selected for comparison. However, it will be apparent that other methods of selecting the nodes to be added to the set of active nodes may also be used without departing from the scope of this invention.

Figure 12:
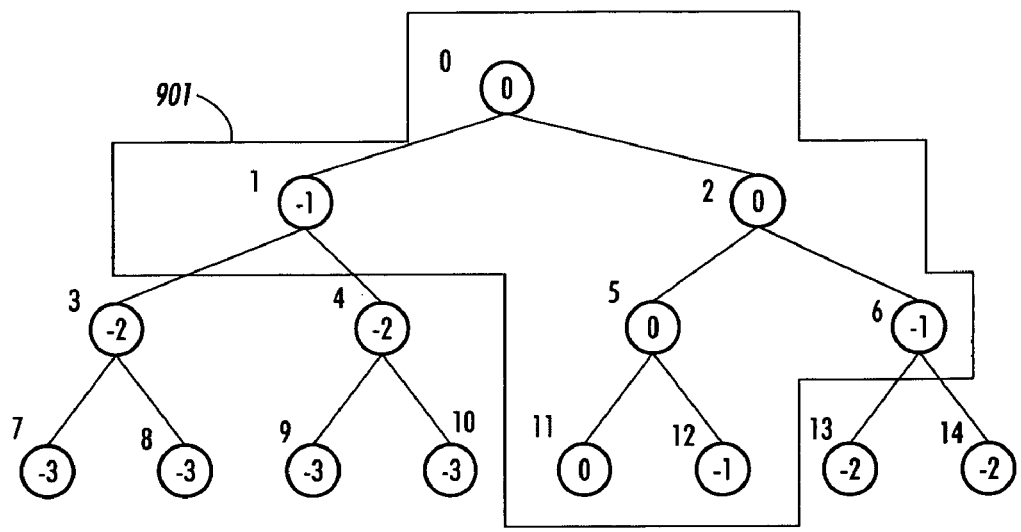
FIG. 12 shows a second set of active nodes according to one of the exemplary embodiments of this invention.

FIG. 12 shows a second set of active nodes according to one of the exemplary embodiments of this invention. The set of active nodes 901 are determined by adding adjacent connected nodes to the initial set of active nodes. Adjacent connected nodes are added to the set of active nodes if the Degree-Of-Interest for the node exceeds the threshold disinterest value. The nodes closest to the set of initial active nodes and having a Degree-Of-Interest value below the threshold disinterest value define a boundary between the disinterest valued non-visible nodes and the visible nodes associated with Degree-Of-Interest above the threshold disinterest value. It will be apparent that nodes outside of the set of active nodes are associated with saturated Degree-Of-Interest values equal to the threshold disinterest value.

While this invention has been described in conjunction with the exemplary embodiments outlined above, it is evident that many alternative, modifications and variations will be apparent to those skilled in the art. Accordingly, the exemplary embodiments of the invention, as set forth above, are intended to be illustrative, not limiting. Various changes may be made without departing from the spirit and scope of the invention.

Each of the circuits 10–81 of the user interest estimation manager or system 100 outlined above can be implemented as portions of a suitably programmed general-purpose computer. Alternatively, 10–81 of the user interest estimation manager or system 100 outlined above can be implemented as physically distinct hardware circuits within an ASIC, or using a FPGA, a PDL, a PLA or a PAL, or using discrete logic elements or discrete circuit elements. The particular form each of the circuits 10–81 of the user interest estimation manager or system 100 outlined above will take is a design choice and will be obvious and predicable to those skilled in the art.

Moreover, the user interest estimation manager or system 100 and/or each of the various circuits discussed above can each be implemented as software routines, managers or objects executing on a programmed general purpose computer, a special purpose computer, a microprocessor or the like. In this case, the user interest estimation manager or system 100 and/or each of the various circuits discussed above can each be implemented as one or more routines embedded in the communications network, as a resource residing on a server, or the like. The user interest estimation manager or system 100 and the various circuits discussed above can also be implemented by physically incorporating the user interest estimation manager or system 100 into a software and/or hardware system, such as the hardware and software systems of a web server or a client device.

As shown in FIGS. 3 and 5, memory 20 and 21 can be implemented using any appropriate combination of alterable, volatile or non-volatile memory or non-alterable, or fixed memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 99 shown in FIGS. 1, 3 and 5 can each be any known or later developed device or system for connecting a communication device to the user interest estimation manager or system 100, including a direct cable connection, a connection over a wide area network or a local area network, a connection over an intranet, a connection over the Internet, or a connection over any other distributed processing network or system. In general, the communication links 99 can be any known or later developed connection system or structure usable to connect devices and facilitate communication Further, it should be appreciated that the communication links 99 can be a wired or wireless links to a network. The network can be a local area network, a wide area network, an intranet, the Internet, or any other distributed processing and storage network.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of determining user interest estimations comprising:
   determining a threshold disinterest value;
   determining a graph based information structure containing at least two nodes;
   determining at least one interesting node in the graph based information structure;
   for each of the at least one interesting nodes;
      determining a set of active nodes that is a subset of the graph, based on the at least one interesting nodes;
      repeatedly adding adjacent connected nodes to the set of active nodes, based on a Degree-Of-Interest value and the determined threshold disinterest value.

2. The method of claim 1, in which interesting nodes are determined based on at least one of: an explicit indication of a focus of attention, and an inferred indication of a focus of attention.

3. The method of claim 1, in which processing the active nodes is comprised of displaying the active nodes on a display system.

4. The method of claim 1, in which the step of repeatedly adding nodes adjacent to and connected to the set of active nodes based on the degree of interest values of the nodes is comprised of the steps of:
   comparing the Degree-Of-Interest value of an adjacent connected node to the threshold disinterest value; and
   adding nodes that are more interesting than the disinterest threshold value to the set of active nodes.

5. The method of claim 1, having Degree-Of-Interest values based on at least one of: ordered positive values, ordered negative values.

6. The method of claim 1, having more interesting Degree-Of-Interest values are at least one of: less than a threshold disinterest value, more than a threshold disinterest value.

7. The method of claim 1, in which at least one interesting node is determined based on a focus of attention.

8. The method of claim 7, in which the focus of attention is based on tracking indicators of the focus of attention.

9. The method of claim 8, in which the indicators of the focus of attention include at least one of: eye tracking, head tracking, cursor tracking and speech tracking.

10. The method of claim 1, in which the graph structure is a hierarchical structure.

11. The method of claim 10, in which the hierarchical structure is a tree structure.

12. A system for managing user interest estimations comprising:
   an input/output circuit for receiving a graph based information structure to be visualized, the graph based information structure comprising at least two nodes;
   a threshold disinterest value memory;
   an interesting node determination circuit for determining at least one interesting node within the graph based information structure and adding the at least one interesting node to a set of active nodes that is a subset of the graph, in a memory;
   a connected node determination circuit that determines candidate active nodes in the graph based information structure adjacent to and connected to each of the active nodes based on the Degree-Of-Interest value determined by a degree of interest determination circuit; and
   a processor that adds the determined nodes with Degree-Of-Interest values above the threshold value to the set of active nodes; and
   a transformation circuit that processes the active nodes.

13. The system of claim 12, in which interesting nodes are determined based on at least one of: an explicit indication of a focus of attention, and inferred indication of a focus of attention.

14. The system of claim 12, in which the transformation circuit is comprised of a display circuit that displays the active nodes on a display system.

15. The system of claim 12, in which the processor repeatedly adds nodes adjacent to and connected to the set of active nodes based on the degree of interest values of the nodes by comparing the Degree-Of-Interest value of an adjacent connected node to the threshold disinterest value; and adding more interesting nodes to the set of active nodes.

16. The system of claim 12, in which Degree-Of-Interest values are based on at least one of: ordered positive values, ordered negative values.

17. The system of claim 12, in which more interesting Degree-Of-Interest values are at least one of: less than a threshold disinterest value, more than a threshold disinterest value.

18. The system of claim 12, in which at least one interesting node is determined based on a focus of attention.

19. The system of claim 18, in which the focus of attention is based on tracking indicators of the focus of attention.

20. The system of claim 19, in which the indicators of the focus of attention are based on at least one of: eye tracking, head tracking, cursor tracking and speech tracking.

21. The system of claim 12, in which the graph structure is a hierarchical structure.

22. The system of claim 21, in which the hierarchical structure is a tree structure.

23. Computer readable storage medium comprising: computer readable program code embodied on the computer readable storage medium, the computer readable program code usable to program a computer for determining user interest estimations comprising the steps of:
  determining a threshold disinterest value;
  determining a graph based information structure containing at least two nodes;
  determining at least one interesting node from the graph based information structure;
  for each of the at least one interesting nodes;
    determining a set of active nodes that is a subset of the graph, based on the at least one interesting nodes;
    repeatedly adding adjacent connected nodes to the set of active nodes, based on a Degree-Of-Interest value and the determined threshold disinterest value.

24. A carrier wave encoded to transmit a control program, useable to program a computer to determine user interest estimations, to a device for executing the program, the control program comprising:
  instructions for determining a threshold disinterest value;
  instructions for determining a graph based information structure containing at least two nodes;
  instructions for determining at least one interesting node in the graph based information structure;
  instructions for determining a set of active nodes that is a subset of the graph, based on the at least one interesting nodes;
  instructions for repeatedly adding adjacent connected nodes to the set of active nodes, based on a Degree-Of-Interest value and the determined threshold disinterest value.

25. A means of determining user interest estimations comprising:
  a processor for determining a graph based information structure containing at least two nodes;
  a memory for storing the graph based information structure; and
  a means for determining a threshold disinterest value;
  a means for determining at least one interesting node in the graph based information structure;
  a means for determining a set of active nodes in the graph based information structure that is a subset of the graph, based on the at least one interesting nodes for each node in the graph based information structure;
  a means for repeatedly adding adjacent connected nodes to the set of active nodes, based on a Degree-Of-Interest value and the determined threshold disinterest value.

* * * * *